(12) United States Patent
Letas et al.

(10) Patent No.: US 8,400,003 B2
(45) Date of Patent: Mar. 19, 2013

(54) WIND ENERGY INSTALLATION HAVING A DOUBLE-ENERGIZED ASYNCHRONOUS GENERATOR AND CONVERTER CONTROL

(75) Inventors: Heinz-Hermann Letas, Suesel (DE); Jens Fortmann, Berlin (DE)

(73) Assignee: REpower Systems AG, Hamburg (DE)

( * ) Notice: Subject to any disclaimer, the term of this patent is extended or adjusted under 35 U.S.C. 154(b) by 419 days.

(21) Appl. No.: 12/735,853

(22) PCT Filed: Feb. 18, 2009

(86) PCT No.: PCT/EP2009/001139
§ 371 (c)(1),
(2), (4) Date: Aug. 20, 2010

(87) PCT Pub. No.: WO2009/103504
PCT Pub. Date: Aug. 27, 2009

(65) Prior Publication Data
US 2010/0320762 A1    Dec. 23, 2010

(30) Foreign Application Priority Data

Feb. 20, 2008   (DE) .......................... 10 2008 010 260
Jul. 24, 2008   (DE) .......................... 10 2008 034 531
Jul. 24, 2008   (DE) .......................... 10 2008 034 532

(51) Int. Cl.
*F03D 9/00* (2006.01)
(52) U.S. Cl. ........................................... 290/44; 290/54
(58) Field of Classification Search .................. 290/44, 290/54–55
See application file for complete search history.

(56) References Cited

U.S. PATENT DOCUMENTS

| | | | |
|---|---|---|---|
| 5,652,485 A | 7/1997 | Spiegel et al. | |
| 6,512,966 B2 * | 1/2003 | Lof et al. ..................... | 700/291 |
| 7,518,256 B2 * | 4/2009 | Juanarena Saragueta et al. ............................. | 290/44 |
| 7,622,815 B2 * | 11/2009 | Rivas et al. .................... | 290/44 |
| 7,741,728 B2 * | 6/2010 | Fortmann et al. ............... | 290/44 |
| 7,834,472 B2 * | 11/2010 | Rebsdorf et al. ................ | 290/44 |
| 2003/0214823 A1 | 11/2003 | Kawazoe et al. | |

FOREIGN PATENT DOCUMENTS

| | | |
|---|---|---|
| DE | 10 2007 028 582 | 12/2007 |
| GB | 2 432 267 | 5/2007 |
| WO | WO-2005/099063 | 10/2005 |
| WO | WO-2009/103504 | 8/2009 |

OTHER PUBLICATIONS

International Search Report and Written Opinion mailed Sep. 3, 2009, directed to counterpart application PCT/EP2009/001139; 12 pages.

* cited by examiner

*Primary Examiner* — Truc Nguyen
(74) *Attorney, Agent, or Firm* — Morrison & Foerster LLP (57) ABSTRACT

A method for controlling a converter of a wind energy installation. The converter is connected to the rotor of a doubly-fed asynchronous generator in order to feed electrical power into an electrical grid and comprises a generator-side inverter, a grid-side inverter, and at least one converter regulator for regulating and/or controlling current output from at least one of the inverters to the doubly-fed asynchronous generator and/or to the electrical grid. The method includes detecting a change in output real power, determining whether the detected change satisfies a predefined condition, and changing a nominal value of reactive power to be output in an opposite sense to a change in real power at the grid-side inverter and in a same sense as the generator-side inverter when the predefined condition is satisfied.

13 Claims, 5 Drawing Sheets

WIND ENERGY INSTALLATION HAVING A DOUBLE-ENERGIZED ASYNCHRONOUS GENERATOR AND CONVERTER CONTROL

REFERENCE TO RELATED APPLICATIONS

This application is a national stage application under 35 USC 371 of International Application No. PCT/EP2009/001139, filed Feb. 18, 2009, which claims the priority of German Patent Application Nos. 10 2008 010 260.1, filed Feb. 20, 2008, 10 2008 034 531.8, filed Jul. 24, 2008, and 10 2008 034 532.6, filed Jul. 24, 2008, the contents of which prior applications are incorporated herein by reference.

FIELD OF THE INVENTION

The invention relates to a method for controlling a converter of a wind energy installation, which converter is connected to the rotor of a doubly-fed asynchronous generator in order to feed electrical power into an electrical grid, wherein the converter comprises a generator-side inverter and a grid-side inverter. The invention also relates to a wind energy installation having a converter and a converter control system for carrying out the method.

BACKGROUND OF THE INVENTION

Frequency converters are being increasingly used for wind energy installations. Modern wind energy installations normally have a variable rotation speed, as a result of which the generator produces alternating current at a different frequency. Frequency conversion is necessary for feeding into a fixed-frequency supply grid (normally 50 Hz). Frequency converters are used for this purpose. In this case, it is preferable to use converters which consist of a generator-side inverter which is electrically connected to the rotor of the generator, a DC voltage intermediate circuit and a grid-side inverter which is electrically connected to the grid. Energy installations have normally been operated such that they are disconnected from the grid in the event of grid faults, in particular short circuits. With the increasingly widespread use of wind energy installations and the increase in the installed wind power, the requirement is, however, no longer simply for real current to be fed into the electrical grid, but it is desirable for the wind energy installations to be operated to support the grid voltage. This grid voltage therefore comprises feeding in real power even under unfavourable conditions, such as discrepancies in voltage or discrepancies of the grid voltage from the nominal value. In the case of reduced voltage or reduced grid frequency, a supporting operation is desirable. In the case of the doubly-fed asynchronous generators which are frequently used for relatively high-power wind energy installations, one problem that can arise is that the converter is designed for only about one third of the electrical power of the wind energy installation and can no longer achieve the additionally required currents for supporting the grid.

It is known from DE 10 2007 028 582 A1 for the generator-side inverter in the case of a generator with a full converter, via which all of the electrical power is fed into the electrical grid, to be connected directly to the grid, to be precise when the generator is no longer generating power and the grid-side inverter can therefore be used to feed additional reactive power into the grid. This concept has the disadvantage that the desired support can be provided only when the generator is not outputting any power.

SUMMARY OF THE INVENTION

The invention is based on the object of improving the grid support in wind energy installations of the type mentioned initially with a doubly-fed asynchronous generator.

The solution according to the invention lies in the features broadly disclosed herein. Advantageous developments are described in the disclosure below.

In a method for controlling a converter of a wind energy installation, which converter is connected to the rotor of a doubly-fed asynchronous generator in order to feed electrical power into an electrical grid, wherein the converter comprises a generator-side inverter, a grid-side inverter and at least one converter regulator for regulating and/or controlling the current which is output from the at least one of the inverters to the doubly-fed asynchronous generator and/or to the electrical grid, the invention provides for detection of a change in the output real power, determination of whether the detected change satisfies a predefined condition, and change in the nominal value of the reactive power to be output, to be precise in the opposite sense to the change in the real power at the grid-side inverter and in the same sense as the generator-side inverter, when the predefined condition is satisfied.

A number of the terms used will first of all be explained in the following text:

The real power means that part of the power output from the wind energy installation into the grid which results from the product of the voltage and the current that is in phase with it (real current). The reactive power is the product of the voltage and the out-of-phase current (reactive current).

A change in the real power means a change in the amplitude or phase angle of the currents with respect to one another or with respect to the grid voltage or some other reference value. In the case of the generator-side converter, this also includes the change in the currents which are applied to the generator stator. This does not depend on the nature of the calculation or representation, and the generator-side currents from converter regulators are frequently regulated using so-called field-oriented coordinates, which are calculated from the three-phase system by a mathematical transformation, and are once again fed back into this in order to control the inverters.

A predefined condition means, in particular, the reaching of an adjustable limit value for grid parameters, such as the grid voltage or grid frequency. This variable can, but need not be, directly measurable, but can also be determined by calculation. In this case, the predefined condition does not necessarily need to occur at the same time in all three phases, but it is sufficient for it to occur in only one or two phases.

The invention is based on the knowledge that the usefulness of the potential of a wind energy installation with a doubly-fed asynchronous generator can be considerably improved if, when certain conditions occur in the grid, the nominal value presets of both inverters of the converter are changed, to be precise in opposite senses with respect to one another. Such adjustment of the inverters in opposite senses improves the overall response of the converter and of the entire wind energy installation in such a way as to allow the grid to be supported better.

In this case, the method according to the invention operates as follows. A check is carried out to determine whether there are any changes with respect to the output real power. Changes such as these frequently occur as a consequence of changed states in the grid, such as changes in the grid voltage and/or grid frequency.

In a second step, a check is carried out to determine whether this change in the output real power actually satisfies the predefined condition, that is to say whether, for example, the grid frequency has fallen below a lower limit value. In the case of a wind energy installation with a doubly-fed asynchronous generator, this is associated with an increase in the real power output via the rotor circuit, that is to say via the grid-side inverter, into the grid. The available current margin of the grid-side inverter for feeding in reactive power is thereby reduced, which until now has meant a restriction to the operation and the grid support by the wind energy installation. The invention avoids this by providing a deliberate change to the reactive power nominal value of both inverters, with these changes being matched to one another, that is to say for both the grid-side inverter and the generator-side inverter. In a measure which appears to be contradictory at first glance, the reactive power nominal value at the grid-side inverter is, according to the invention, changed in the opposite sense, that is to say the reactive power nominal value is reduced when the real power output from it increases, while, according to the invention, in the case of the other inverter, the generator-side inverter, the nominal value for the reactive power is changed in the opposite sense, that is to say it is increased by the same sense. This increase in the same sense in the nominal value at the generator-side inverter is preferably carried out in such a way that this results in grid compensation for the reactive power reduction at the grid-side inverter. The wind energy installation operated according to the invention therefore has a neutral response in terms of the reactive power to the grid, while, at the same time, the full, unreduced real power is still fed in to support the grid. Deliberate overcompensation by locally feeding inductive or capacitive reactive power in order to further support the grid should, however, not be precluded.

The real power change is preferably detected by monitoring the grid frequency. This is based on the knowledge that the real power balance in a grid is expressed in the frequency. For example, if the real power is too low, the grid frequency falls, while it rises if there is too much real power. The invention makes use of this in order to detect changes with respect to the real power by monitoring the grid frequency. This can be done directly or indirectly. This is done directly by measuring the grid frequency by means of a suitable sensor, for example on the basis of the zero crossings of voltage or current sensors. However, this can also be done indirectly, by measuring the frequency and using this as the basis to determine whether there has been a change in the real power; in this case, the real power can form an intermediate variable, as is calculated by an observer, for example, or it can be replaced by other state variables which no longer have their own physical reference. This type of detection offers particular advantages when the grid frequency falls, to be precise below a lower limit value. As already described above, this results in more real power being fed in via the grid-side inverter, as a result of which, according to the invention, the reactive power nominal value of this inverter is reduced and, corresponding to this, that of the generator-side inverter, which is not directly affected per se, is correspondingly increased. This particular type of mutual matching of the two inverters of the converter means that the volt-amperes at the grid-side inverter do not rise or rise only slightly, despite the increased amount of real power fed in, as a result of which there is no longer any need for the reduction in the real power, which was previously required in this case, in order to prevent overloading of the grid-side inverter. The wind energy installation can therefore still provide the real power which is urgently required in the grid, without any reduction in level, in the event of a grid disturbance such as this. A corresponding argument applies to the opposite situation when a grid frequency is too high when an upper limit value is overshot.

The invention therefore achieves better utilization of the components of the wind energy installation, in particular of the inverters in the converter. The existing margins in the wind energy installation, in particular with regard to the volt-amperes of the generator-side inverter, are made better use of.

Therefore, the total reactive current output of both inverters remains unchanged, but the reactive current output from the more highly loaded inverter is reduced, and that from the more lightly loaded inverter is increased, as a result of which no negative change is perceived overall in the electrical grid. The converter control system therefore reduces the peak load on the individual inverters and the power strands associated with them. In particular, in this case, the converter control system can take account of the design limits of the inverters and of the associated power strands, and can as far as possible adapt the current load, with regard to the load level relative to the design limit in the respective inverters or the power strands associated with them. This has the advantage that both power strands have the same proportional margin and that it is possible to avoid excessive loading on one side with a brief high or excessive load, for example as a result of short circuits in the vicinity of the wind energy installation.

In this context, power strands which are associated with the inverters means those electrical components which, seen electrically from the inverter, are located between the inverter and the electrical grid. That is to say, for the grid-side inverter, for example, the grid inductor, the grid filter, the converter-side tower cables and the converter-side transformer winding, depending on the embodiment. By way of example, for the generator-side inverter, these are, depending on the embodiment, the connecting cables to the generator rotor including the rotor tower cables, the generator rotor, the generator stator, the stator-side tower cables and, depending on the transformer embodiment, the generator-side transformer winding. According to a further preferred embodiment, in the event of an unbalance such that the limit value is overshot in only one or two phases, but not in all the phases, the nominal values for the reactive power of the other inverter are changed so as to reduce the unbalance. This implies the other inverter is also in this case driven in an unbalanced form. The unbalance can therefore be counteracted, preventing damage to the wind energy installation.

The change in the opposite sense in the nominal value of the reactive power is preferably of such a magnitude that the volt-amperes of the grid-side inverter remain constant. This results in maximum utilization of the grid-side inverter, and at the same time achieves optimum grid support. In this case, constant means a change in the output of at most 10%, and preferably of at most 3%. However, it is also possible to provide for the change in the opposite sense in the nominal value of the reactive power to be of such a magnitude that the volt-amperes output from the wind energy installation remain constant. This offers the advantage of greater grid neutrality. This can be advantageous, particularly in the case of spatially extended wind farms, when relatively long communication paths exist, and the installations which are located further away are therefore brought to a grid-neutral operating mode, and installations which are located spatially closer and can therefore be controlled more quickly are used to vary the volt-amperes and reactive power.

Pilot control is preferably carried out in such a way that the change in the reactive power nominal value for at least one of the two inverters is carried out as a function of the grid frequency. This makes it possible to react quickly to changes in the grid frequency without any need prior to this for unnecessary approaches to the load limits of the components, particularly the volt-amperes or the current limit of the grid-side inverter. Such pilot control can also be carried out with respect to state variables of the wind energy installation, for example with respect to the temperature of the converter and its inverters, and/or the generator. If there is a threat of the grid-side inverters over-heating, then, according to the invention, its reactive power nominal value is reduced, and that of the generator-side inverter is correspondingly increased. A corresponding procedure is used in the event of thermal overloading of the generator-side inverter, or of the generator itself.

The invention furthermore relates to a wind energy installation having a wind rotor, a doubly-fed asynchronous generator which is driven by the wind rotor, having a converter comprising a generator-side inverter, a grid-side inverter and at least one converter regulator for feeding electrical power into a grid, and a control device which interacts with the converter regulator and is designed to control or regulate the current which is output from at least one of the inverters to the doubly-fed asynchronous generator and/or to the electrical grid, wherein, according to the invention, a measurement module for detecting the output real power and a change determining module are provided, the latter of which is designed to detect a change in the output real power and to determine whether the detected change satisfies a predefined condition, as well as to change the nominal value of the output reactive power in the opposite sense to the change in the real power for the grid-side inverter and in the same sense for the generator-side inverter, when the condition is satisfied.

The change determining module preferably interacts with an adaptation module, which is designed to provide grid compensation for the volt-amperes.

The measurement module expediently has sensors for determining the voltage and the real current. This makes it possible to autonomously determine values for the real power output. However, this should not preclude such values being determined from the control device and parameters which exist there in any case. The complexity for additional sensors is reduced in this way.

In addition, the converter regulator is preferably designed to carry out the method as described above. For a more detailed explanation, reference is made to the above description.

BRIEF DESCRIPTION OF THE DRAWINGS

The invention will be explained in more detail in the following text with reference to the attached drawings, which illustrate one advantageous exemplary embodiment, and in which:

FIG. 3 *a, b*: show power diagrams for the operating behaviour of the converter without the method according to the invention;

FIG. 4 *a, b*: show power diagrams for the operating behaviour of the converter with the method according to the invention;

FIG. 5 *a, b*: show reactive power diagrams for the method according to the invention.

DETAILED DESCRIPTION OF THE INVENTION

Figure 1:
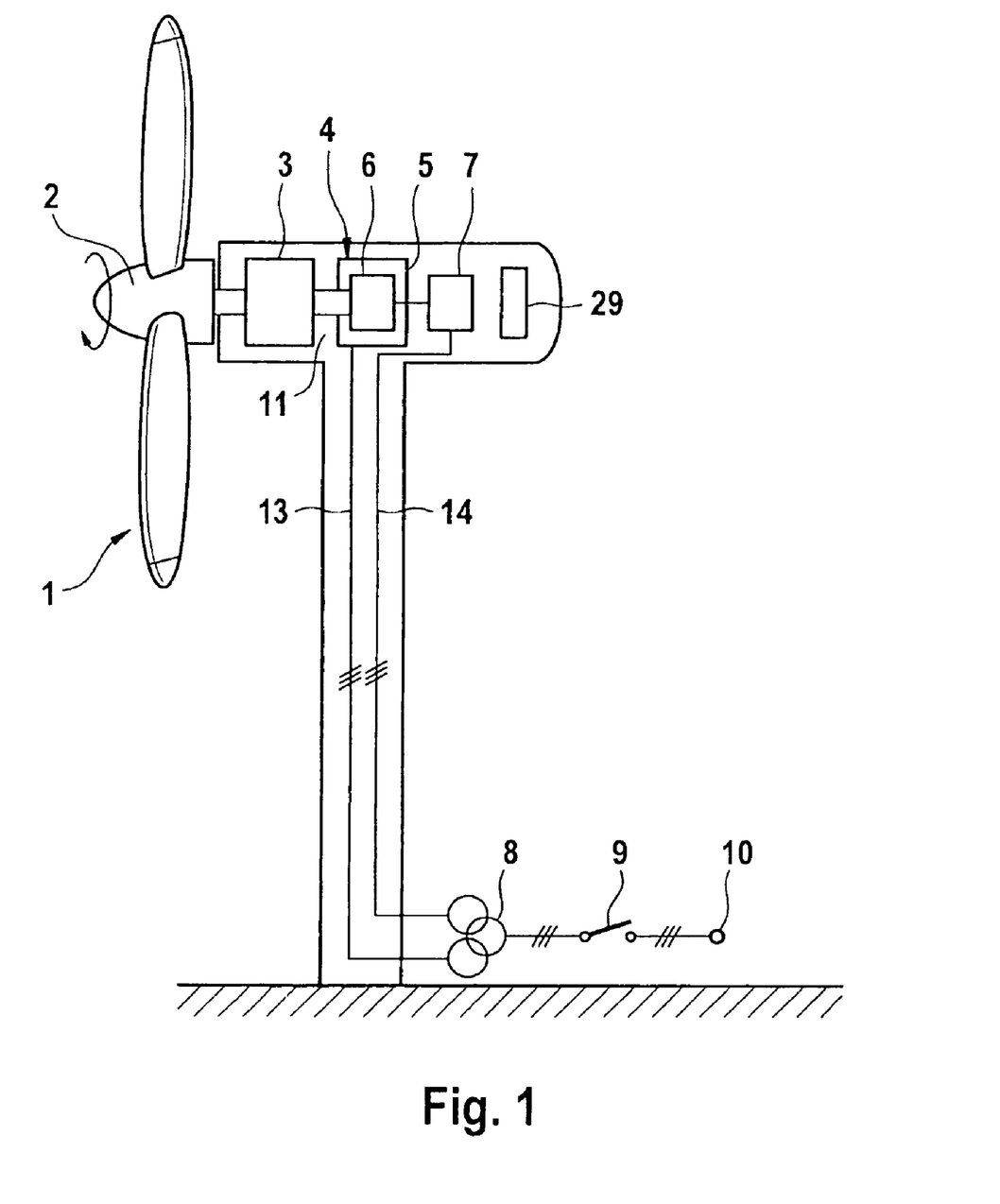
FIG. 1: shows a schematic overall view of a wind energy installation.

The general design of the wind energy installation will be explained briefly with reference to FIG. 1. The wind rotor 2 of the wind energy installation 1 is caused to rotate by the wind. The wind rotor 2 is in this case mechanically connected to the generator 4 via a gearbox 3, and causes a rotor 6 of the generator 4 to rotate. A stator 5 of the generator is connected via power cables 13 in the tower, a transformer 8 and a switch disconnector 9 to the electrical grid 10. The rotor 6 of the generator 4 is connected to a converter 7, which is in turn likewise connected via power cables 14 in the tower, the transformer 8 and the switch disconnector 9 to the electrical grid 10.

In the illustrated exemplary embodiment, the transformer 8 has three windings, that is to say it has separate windings in each case for the power strand from the stator 5 and from the converter 7. Embodiments with only two or a different, greater number of windings, are likewise possible.

Figure 2:
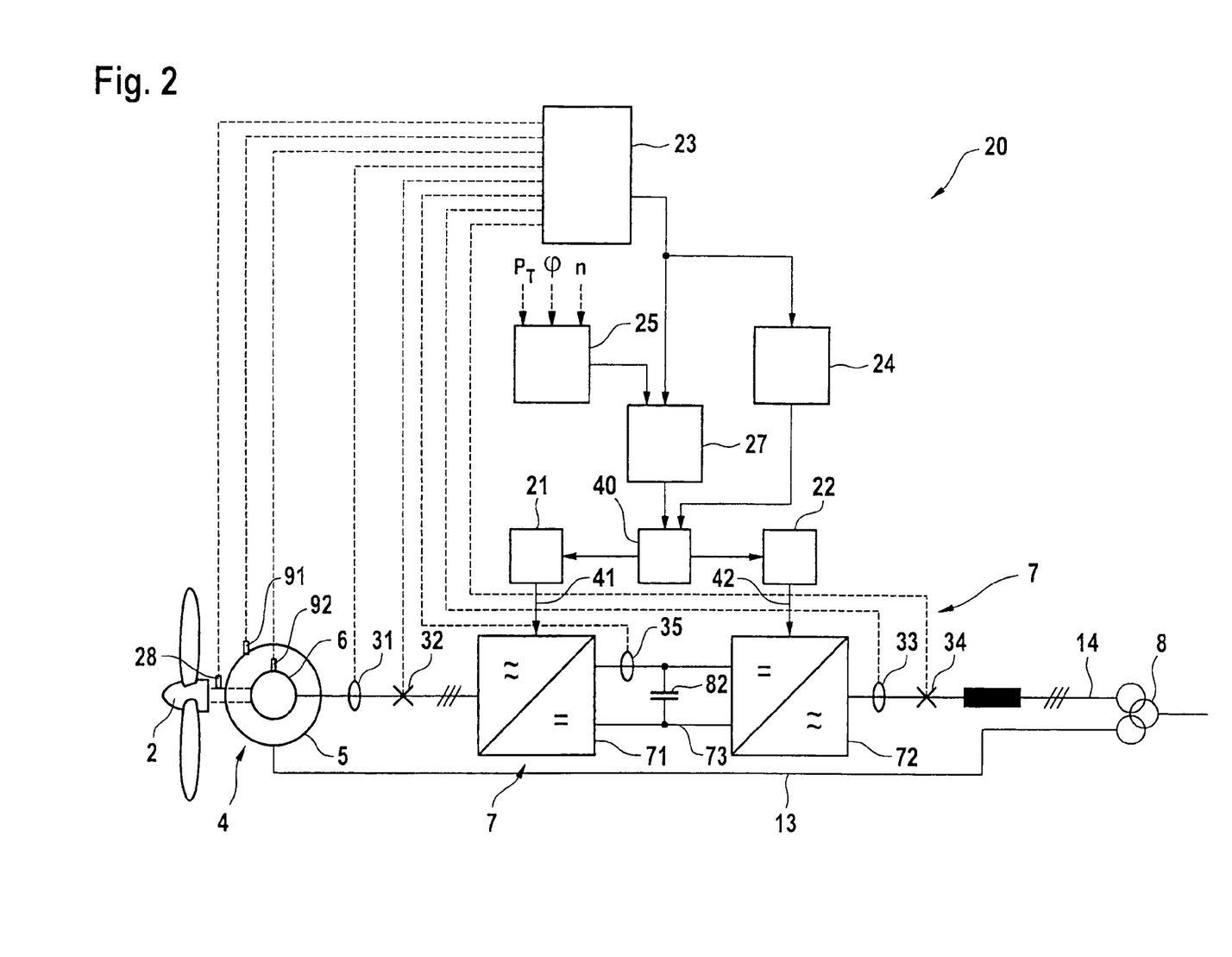
FIG. 2: shows one exemplary embodiment of a converter regulator according to the invention.
Figure 3:
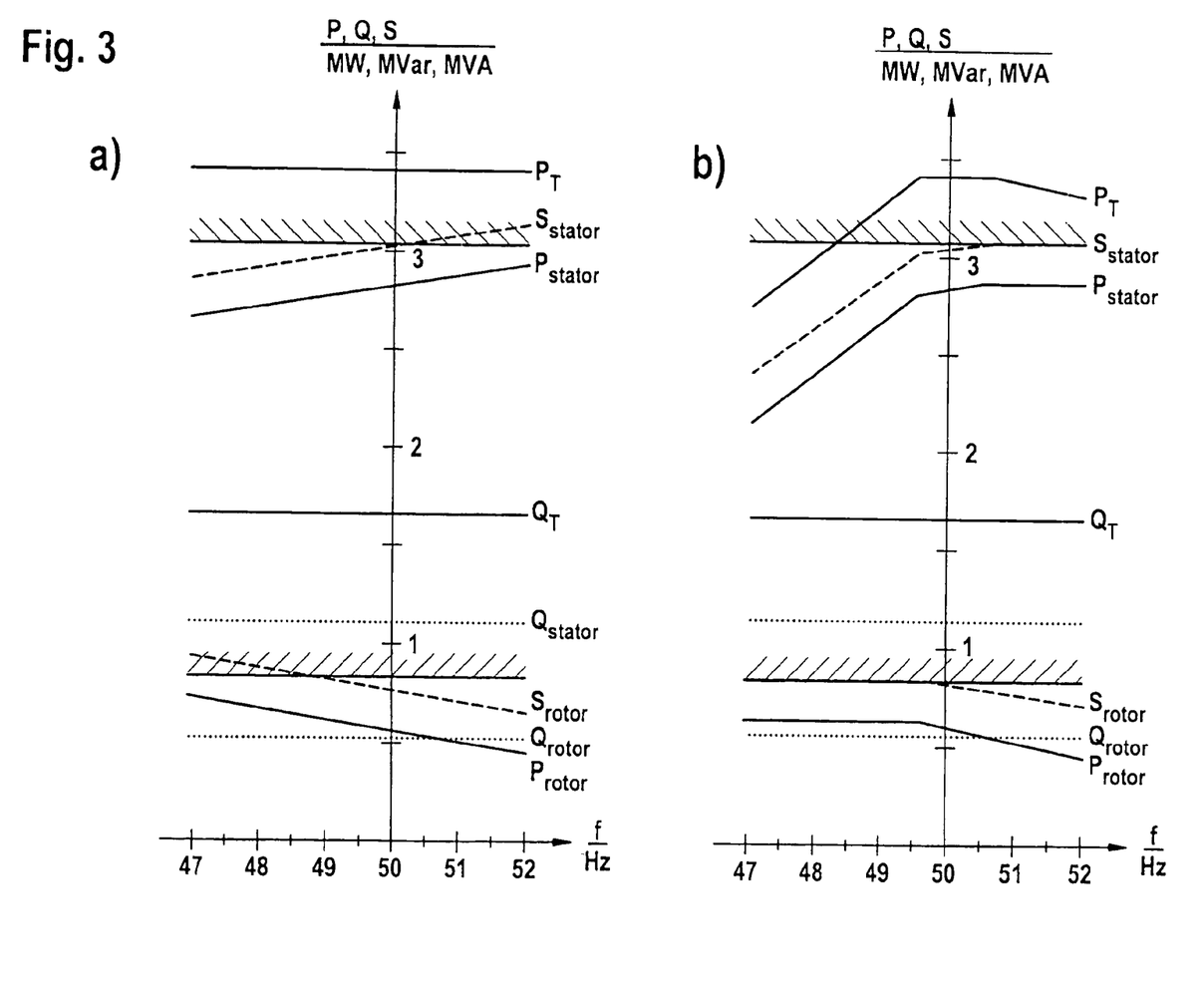

The design of the converter 7 and its control system are illustrated in more detail in FIG. 2. As main components, the converter 7 comprises a generator-side inverter 71 and a grid-side inverter 72, which are connected via a DC voltage intermediate circuit 73. The grid-side inverter 72 is connected to the transformer 8 via an inductor 12. The generator-side inverter 71 is connected to the rotor 6 of the generator 4. A capacitor 82 is arranged as an energy store in the DC voltage intermediate circuit 73. It should be noted that the DC voltage intermediate circuit may also be in the form of a direct-current intermediate circuit, in which case an inductance can then be provided in a corresponding manner as an energy store.

A converter regulator 20 is provided in order to control the converter 7, and comprises, as main components, inverter regulators 21, 22, which control the respective inverters 71, 72 associated with them by means of respective control lines 41 and 42.

The converter regulator 20 is designed to control the generator 4, depending on the load and depending on the rotation speed, in a sub-synchronous, synchronous or super-synchronous operating mode. At a low rotation speed, it is operated in the sub-synchronous range, in which case power then flows via the converter 7 into the rotor 6. During operation at the synchronous point, no current flows via the converter 7, but instead all of the current which is generated is fed solely from stator 5 into the transformer 8. At high rotation speed, it is operated in the super-synchronous range, in which the power produced by the generator 4 is output both via the stator 5 and via the rotor 6 and the converter 7. In this case, it is normally designed such that, in the super-synchronous mode, 60 to 90% of the electrical power produced by the generator 4 is output via the stator and, correspondingly 10 to 40% is output via the rotor 6 and the converter 7.

The respective electrical variables of the converter 7 with its inverters 71, 72, and the wind energy installation overall, in particular the voltages which are present and the real and reactive currents which flow, and the intermediate-circuit voltage, are measured by means of sensors 31, 32, 33, 34, 35, and are supplied to a measurement module 23 in the converter regulator 20. It should be noted that, in addition to or instead of the sensors for real currents and reactive currents, it is also possible to provide the sensors for the real power and reactive power. However, for cost reasons, provision is made in the described exemplary embodiment for the respective currents to be measured, and for the corresponding values for the power (real power and reactive power from the real current and reactive current) to be calculated therefrom by means of the measurement module 23. The following text is based on the assumption that it is possible to calculate in both directions between these variables in a manner known per se, by multiplication by the voltage. At its output, the measurement module 23 produces the measured values and possibly values obtained by further processing, such as the real power and reactive power, for a change determining module 24 and a regulator module 27.

The measurement module 23 is designed to identify a change in the output real current or the output real power, and to output a corresponding output signal, for example when a limit value is overshot at the grid-side inverter 72. It should be noted that the measurement module 23, as an element of the converter regulator 20, can also take account of nominal values to be applied. For example, a change detected by the measurement module 23 may also be present when the maximum permissible current limit of the inverter is overshot by a reactive current nominal value or a reactive power nominal value to be applied. In this situation, the measurement module 23 would output an appropriate signal at its output.

The nominal value determining module 25 determines the power and current nominal values to be output by the wind energy installation and the individual inverters 71, 22, during which process it takes account of the preset values applied by an operating control system 29 of the wind energy installation, for example for the real power $P_T$ and the power factor $\phi$, and further additional sensor values 28 of the wind energy installation, for example the generator rotation speed, the wind speed or component temperatures of the generator 4, of the converter 7 or of the power lines.

The change determining module 24 is designed to determine whether the detected change satisfies a predefined condition. In this case, the change determining module 24 can, in particular, check nominal values for the inverters 71, 72 for predetermined changes, before these are applied via the regulator module 27 to the inverter regulators 21, 22.

In the basic mode, the regulator module 27 compares the respective regulator discrepancies of the inverters 71, 72 with the nominal values, and passes these on to the inverter regulators 21, 22, if the change determining module 24 has not identified a change. However, if the change determining module 24 identifies a change, for example by satisfying a predefined condition, it passes corresponding values to an adaptation module 40, which is connected to the two inverter regulators 21, 22 and interacts with them in order to correct the nominal values to be applied. The predefined condition may relate to various parameters of the wind energy installation and of its components, in particular of the inverters. For example, the predetermined condition may be the overshooting of a permissible limit with respect to a high rotation speed or a high voltage, or a change in the grid frequency.

The inverter regulators 21, 22 then control the switches of the respective inverters 71, 72 corresponding to the applied nominal values, which were possibly changed by the change determining module 24 when the predefined condition occurred, as a result of which the corresponding real and/or reactive currents and/or powers are output.

Furthermore, FIG. 2 shows temperature sensors 91, 92 which are connected to the converter regulator 20. In this case, temperature sensors 91 are provided on the components 4, 8, 13 in the power strand of the generator-side inverter 71, and pass on measured temperature values to the converter regulator 20. Temperature sensors 92 are likewise provided on the components 8, 12, 14 in the power strand of the grid-side inverter 72. If a temperature value overshoots a predetermined temperature limit value, then the converter control system 20 reduces the current output from the relevant inverter 71, 72, and increases the current output by the same amount from the other inverter 71, 72. This change is preferably carried out with respect to the reactive current output.

This will be explained in more detail in the following text, with reference to the method according to the invention. In particular, reference is made to FIGS. 3 to 7.

In order to assist understanding, the method will first of all be explained as it is conventionally carried out. FIGS. 3a and 3b show the operation of the wind energy installation on full load (power rating). At this power level, wind energy installations with doubly-fed asynchronous machines 4 are designed such that the split in the real power between the rotor 6 and the stator 5 results from the ratio of the synchronous rotation speed $N_{sync}$ and the rated rotation speed $N_{rat}$, or from the machine slip. In this case, the real power of the stator 5 is obtained from the ratio of the synchronous rotation speed to the rated rotation speed multiplied by the total real power:

$$P_{stator}=N_{sync}/N_{rat} \times P_{wei},$$

and the rotor real power is obtained in a corresponding manner from the difference between the total real power minus the stator real power $$P_{rotor}=P_T-P_{stator}.$$

During actual operation fluctuations occur in the grid parameters. These may be, on the one hand, fluctuations in the grid voltage or the grid frequency. The aim is that the output of the real power and reactive power to the grid should remain as constant as possible, even in the event of fluctuations in said grid parameters. This is represented in FIG. 3a by the two horizontal lines, which are represented by $P_T$ and $Q_T$ for the total real power and reactive power of the WEI.

Because of the characteristic of the doubly-fed asynchronous machine 4, the real power split between the stator 5 and the rotor 6 of the generator 4 is shifted on the basis of the grid rated frequency, which in this case is assumed to be 50 Hz. At frequencies below 50 Hz, this therefore results in a greater real power component $P_{rotor}$ of the rotor, as a result of which, in a corresponding manner, the winding of the rotor 6, the converter 7 and the winding of the transformer 8, which is connected to the converter, are more heavily loaded. Frequencies above the rated frequency result in a greater real power component from the stator 5, as a result of which the stator 5 of the generator 4 itself, the generator-side inverter 71 and the winding of the transformer 8 which is connected to the stator 5, and possibly also the stator circuit breaker (not illustrated) are loaded more heavily by greater currents. In the frequency band from 47 Hz to 52 Hz illustrated in the figures, this therefore results, in the worst case of the lower frequency, in a higher load of 130% on the rotor 6, and in the case of the higher frequency a higher load on the stator of 104% of the respective design values for rated operation, as stated above.

If consideration is also given to the fact that the wind energy installation has to output not only the rated real power but also the rated reactive power when outputting its rating, then this results in the volt-amperes that are in each case shown by dashed lines, for the rotor 6 and the stator 5. As can be seen, in the case of the lower frequency for the rotor 6, the permissible load limit is already reached at a frequency of 49 Hz, and would be overshot at an even lower frequency; correspondingly, in the case of the upper frequency for the stator 5, the limit would be reached at a frequency of 50.5 Hz, and would be overshot beyond this.

In order to prevent overloading and the risk of damage associated with it, the respective components in the rotor and stator branches must either be designed to cope with correspondingly higher loads, or the output real power must be reduced in the event of relatively major discrepancies in the grid frequency. The latter is the conventionally adopted approach. This is illustrated FIG. 3b. The real power is reduced as a function of the frequency. At a lower frequency, this means that the power output from the rotor 6 at the lower frequency no longer rises linearly, but is restricted to a frequency of 49.5 Hz, and remains constant. Since the output reactive power remains unchanged, the volt-amperes of the rotor 6 therefore also remain constant, and are therefore locked at the permissible limit, without overshooting it. The rotor 6 and the converter 7 are therefore effectively protected against overloading.

However, because of the electrical coupling in the doubly-fed asynchronous machine 4, this limit in the rotor circuit must affect the stator circuit. This is illustrated in the upper area of FIG. 3b. As can be seen, because of the real power limit of the rotor 6, the real power of the stator 5, which is linked via the synchronous rotation speed, likewise falls, to be precise relatively sharply. Because of the constancy of the reactive power, the volt-amperes of the stator 5 also fall in a corresponding manner. The total real power output $P_T$ of the wind energy installation is therefore decreased considerably in the case of the lower frequency, to be precise to values down to only 77% of the power at the rated frequency of 50 Hz. A corresponding reduction in the real power at the stator 5 is carried out for the case of the upper frequency, with a corresponding consequence for the real power output from the rotor circuit. In this case as well, the total real power output from the wind energy installation is decreased, but falls only to values of 96% of the real power at the rated frequency 50 Hz. Overall, as can be seen, it has been necessary to accept a considerable reduction in the real power output from the wind energy installation, until now, for protection against overloading, particularly in the lower-frequency range. This results in considerable losses for operation and economic utilization of the wind energy installation.

Figure 4:
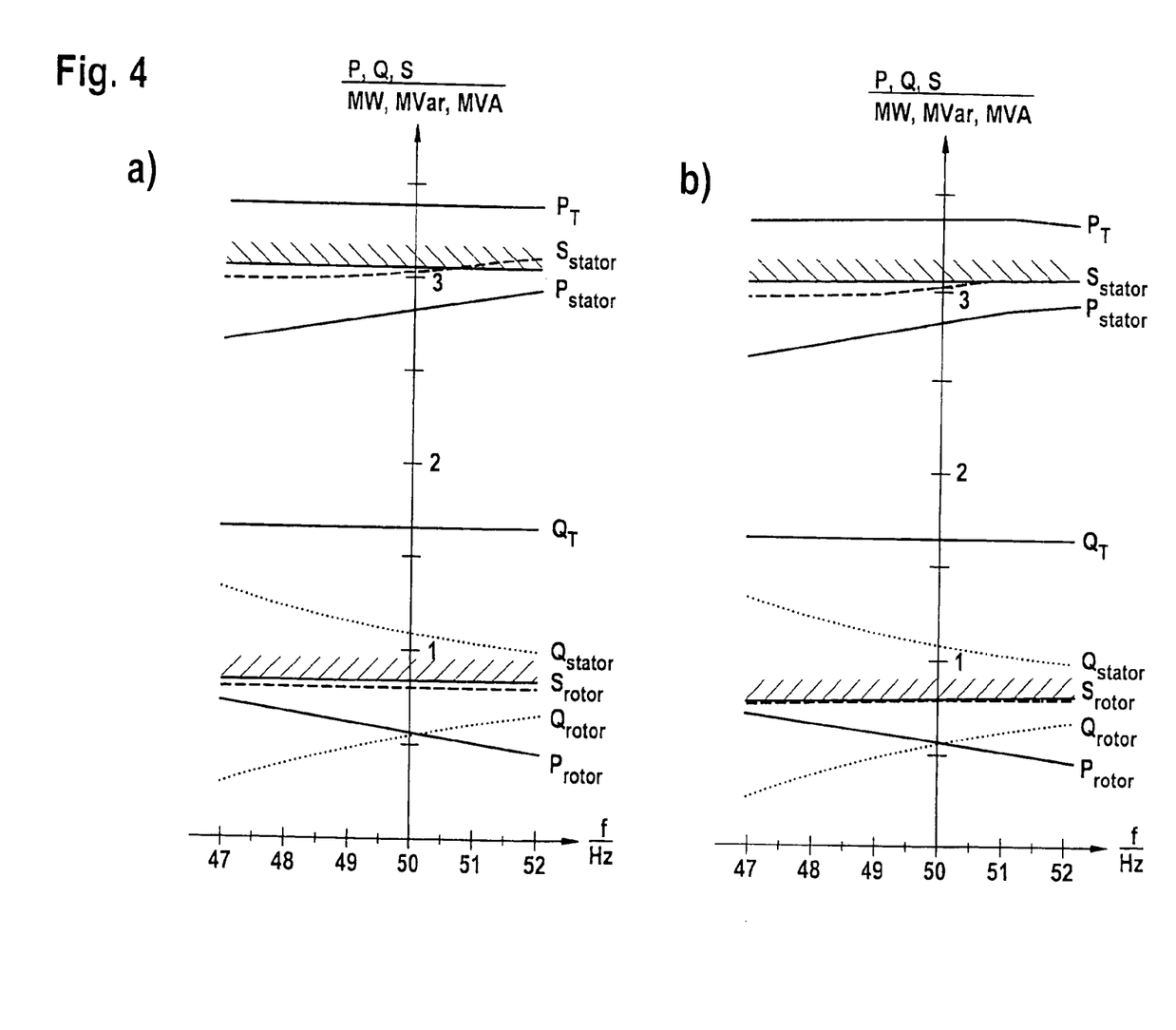
Figure 5:
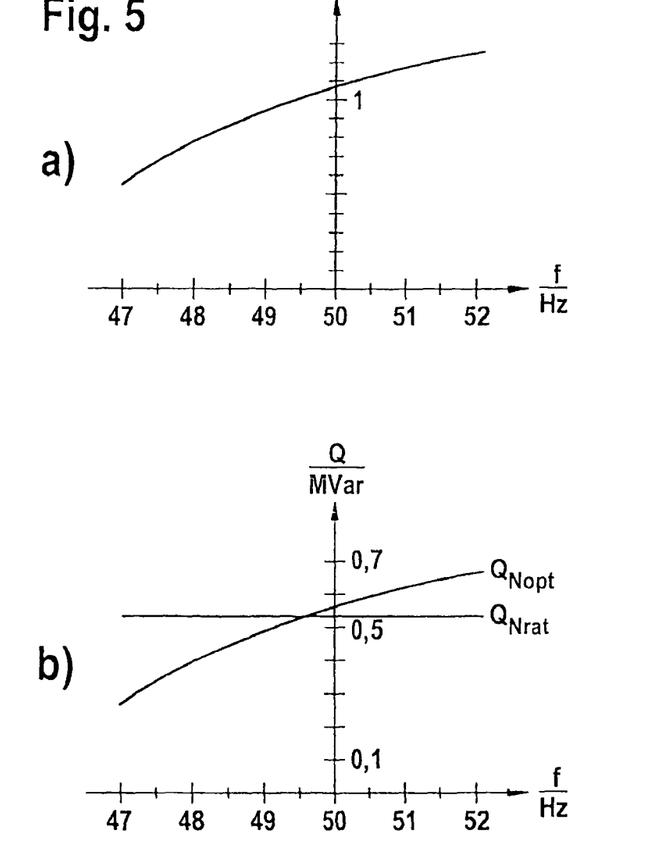

The invention solves this problem by designing the control system for the converter 7 such that the nominal values of the reactive power to be output are changed in opposite senses. Reference will now be made to FIG. 4.

The invention is based on the knowledge that, in the case of a lower frequency, the grid urgently needs to be supplied with real power for stabilization. The real power feed by the wind energy installation should therefore, as far as possible, not be reduced. It is likewise undesirable to reduce the reactive power fed in, in general, because this has a stabilizing effect. At the same time, the load limit, in particular in the rotor circuit, must not be overshot. The invention combines these apparently contradictory aims in that it reduces the nominal value preset for the reactive power to be fed in from the rotor circuit (opposite-sense matching). In consequence, the real power feed does not need to be reduced, but can rise linearly as the frequency falls, in the manner required per se. By reducing the nominal value preset for the reactive power to be fed in, the invention ensures that the total volt-amperes fed in from the rotor circuit comply with the permissible limit, and do not overshoot it. This change in the opposite sense of the nominal values for the real power and reactive power at the rotor therefore achieve the aims of feeding in sufficient real power to support the grid, while on the other hand preventing overloading of the components in the rotor circuit. In a second step, the invention now provides that, in order to compensate for the decreased nominal values for the reactive power in the rotor circuit, those in the stator circuit are increased (matching in the same sense). In this case, the invention makes use of the fact that, because of the need to reduce the real power fed in from the stator 5 at a lower frequency, a sufficient current margin is available such that, overall, the volt-amperes remain in the permissible range (see the left-hand half of FIG. 4a: dashed line $S_{stator}$ remains below the shaded limit marking). The invention therefore makes use of the otherwise unused current capacity at the stator 5, in order to compensate for the "reactive power lack" which is formed by reducing the reactive power nominal values at the rotor 6. This therefore results in optimum utilization of the components, since the total real power $P_T$ and reactive power $Q_T$ output from the wind energy installation at the lower frequency remain constant.

A corresponding argument applies per se to the case of the upper frequency. However, in this case, slight overloading can occur in the stator circuit. This is only in the order of magnitude of about 1% at 52 Hz, and is therefore frequently still within the component tolerances, and therefore does not need to be considered separately. The curves as illustrated in FIG. 4a are then applicable.

However, should it also be necessary to reliably preclude the risk of possible overloading for the case of the higher frequency, then the diagram illustrated in FIG. 4b is applicable. In this case, in the case of higher frequency, the real power output from the stator 5 at a frequency of more than 51 Hz is no longer increased so severely as at lower frequencies (see the bend in the $P_{stator}$ characteristic). This means that the volt-amperes in the stator circuit do not overshoot the limit value. In this case, the invention makes use of the fact that, in the case of the higher frequency, the grid state is intrinsically such that sufficient real power is available (there is frequently even an excess available), as a result of which it is possible to at least tolerate a reduction in the real power feed or this can even be desirable.

The invention therefore achieves the capability, without making the design of the current-carrying components more stringent, to maintain the real power and reactive power feed even when previously critical frequencies are undershot (49.5 Hz as the lower limit frequency and 50.5 Hz as the upper limit frequency), thus providing support for the grid and additionally maximizing the yield from the wind energy installation.

The invention achieves this essentially by shifting the nominal values for the reactive power. FIG. 5a shows the optimum reactive power value according to the invention at the rated operating point for frequency compensation. On the basis of the normally proven value of l=0, it can be seen that the ratio of the optimum reactive power according to the invention to the rated reactive power rises with the frequency. The value which results in this case for the optimum nominal value for the reactive power of the grid-side inverter 72 is illustrated as the curve $Q_{NOpt}$ in FIG. 5b, in comparison to operation with the rated reactive power $Q_{Nrat}$.

Figure 6:
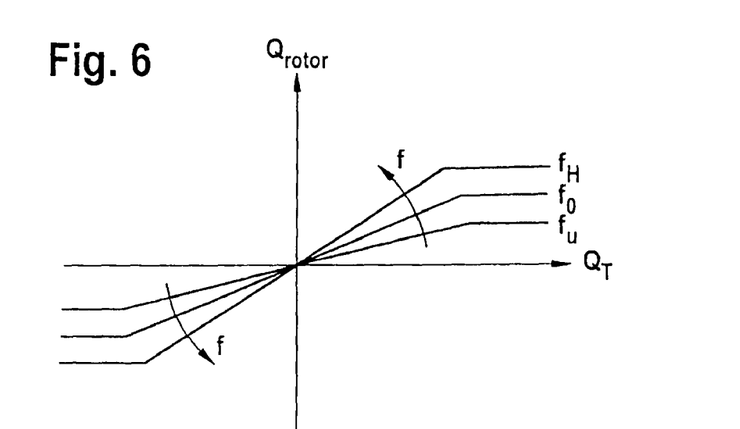
FIG. 6: shows a characteristic diagram.

FIG. 6 shows a family of curves which illustrate the proportion of the reactive power $Q_{72}$ output from the grid-side inverter 72, to the total output reactive power $Q_T$. While, conventionally for wind energy installations, only a single one of these curves is implemented ("reactive power support"), the invention in each case provides a different characteristic depending on the state of the grid, specifically the frequency discrepancy from the grid frequency. This therefore results in a family of characteristics, as illustrated by way of example for three frequencies $F_u < F_0 < F_H$. With this frequency-dependent reactive power support according to the invention, the invention achieves considerably better grid support without modifying the components of the wind energy installation.

The invention claimed is:

1. A method for controlling a converter of a wind energy installation, the converter being connected to a rotor of a doubly-fed asynchronous generator in order to feed electrical power into an electrical grid and comprising a generator-side inverter, a grid-side inverter, and at least one converter regulator for regulating, controlling, or both, current output from at least one of the inverters to at least one of the doubly-fed asynchronous generator and the electrical grid, the method comprising:
  detecting a change in output real power;
  determining whether the detected change satisfies a predefined condition; and
  changing a nominal value of reactive power to be output in an opposite sense to the change in the output real power at the grid-side inverter and in a same sense as the generator-side inverter when the predefined condition is satisfied.

2. The method of claim 1, wherein the output real power is determined from voltage and the output real current.

3. The method of claim 1, wherein the change in the opposite sense and the change in the same sense are matched to one another for reactive power compensation.

4. The method of claim 1, wherein the real power change is detected by monitoring grid frequency.

5. The method of claim 1, wherein the predefined condition comprises a change in grid frequency.

6. The method of claim 1, wherein the change in the opposite sense of the nominal value of the reactive power is of such a magnitude that volt-amperes of the grid-side inverter remain constant.

7. The method of claim 1, wherein the change in the opposite sense of the nominal value of the reactive power is of such a magnitude that volt-amperes output from the wind energy installation remain constant.

8. The method of claim 1, further comprising carrying out pilot control, in which the change in the reactive power nominal value for at least one of the inverters is dependent on grid frequency.

9. The method of claim 8, wherein the change in the opposite sense and the change in the same sense are subjected to pilot control such that a total reactive power of the wind energy installation remains unchanged.

10. The method of claim 8 or 9, wherein the change in the reactive power nominal value is limited as a function of a state variable.

11. The method of claim 10, wherein the state variable comprises a temperature signal of at least one of the doubly-fed asynchronous generator, its rotor, its stator, and at least one of the inverters.

12. The method of claim 5, wherein the change in grid frequency comprises at least one of undershooting of a lower limit frequency and overshooting of an upper limit frequency.

13. A wind energy installation, comprising:
  a wind rotor;
  a doubly-fed asynchronous generator driven by the wind rotor;
  a converter comprising a generator-side inverter, a grid-side inverter, and at least one converter regulator for feeding electrical power into an electrical grid;
  a control device configured to interact with the converter regulator and control or regulate current output from at least one of the inverters to at least one of the doubly-fed asynchronous generator and the electrical grid;
  a measurement module configured to detect output real power; and
  a change determining module configured to detect a change in the output real power, determine whether the detected change satisfies a predefined condition, and change a nominal value of output reactive power in an opposite sense to the change in the output real power for the grid-side inverter and in a same sense for the generator-side inverter when the predefined condition is satisfied.

* * * * *